(12) United States Patent
Huang (10) Patent No.: US 11,859,758 B2
(45) Date of Patent: Jan. 2, 2024

(54) DISPLAY SCREEN BRACKET

(71) Applicant: HUIZHOU CHINA STAR OPTOELECTRONICS DISPLAY CO., LTD., Guangdong (CN)

(72) Inventor: Shuiping Huang, Guangdong (CN)

(73) Assignee: HUIZHOU CHINA STAR OPTOELECTRONICS DISPLAY CO., LTD., Guangdong (CN)

( * ) Notice: Subject to any disclaimer, the term of this patent is extended or adjusted under 35 U.S.C. 154(b) by 162 days.

(21) Appl. No.: 17/600,265

(22) PCT Filed: Jul. 13, 2021

(86) PCT No.: PCT/CN2021/105951
§ 371 (c)(1),
(2) Date: Sep. 30, 2021

(87) PCT Pub. No.: WO2022/262038
PCT Pub. Date: Dec. 22, 2022

(65) Prior Publication Data
US 2022/0403972 A1    Dec. 22, 2022

(30) Foreign Application Priority Data

Jun. 16, 2021    (CN) ............................ 202110666155.9

(51) Int. Cl.
*F16M 11/10*    (2006.01)
*F16M 11/08*    (2006.01)
(Continued)

(52) U.S. Cl.
CPC .......... *F16M 11/08* (2013.01); *F16M 11/045* (2013.01); *F16M 13/02* (2013.01); *F16M 2200/021* (2013.01); *F16M 2200/063* (2013.01)

(58) Field of Classification Search
CPC ...... F16M 11/08; F16M 11/045; F16M 13/02; F16M 2200/021; F16M 2200/063;
(Continued)

(56) References Cited

U.S. PATENT DOCUMENTS 6,288,891 B1 * 9/2001 Hasegawa .............. F16M 11/10
361/679.22
10,533,702 B2 * 1/2020 Kahn ................... A47B 97/001
(Continued)

FOREIGN PATENT DOCUMENTS

| CN | 101869393 A | 10/2010 |
|---|---|---|
| CN | 103576772 A | 2/2014 |

(Continued)

*Primary Examiner* — Terrell L McKinnon
*Assistant Examiner* — Jerry Olivier
(74) *Attorney, Agent, or Firm* — Mark M. Friedman (57) ABSTRACT

The present disclosure provides a display screen bracket. The display screen bracket includes a first support body configured to carry a display screen, a second support body disposed opposite to the first support body, and a first linkage mechanism configured to connect the first support body to the second support body. By means of linkage of the first linkage mechanism, a display screen is swingable about a first axis of the display screen. In this way, watching requirements for different positions and angles are satisfied.

9 Claims, 4 Drawing Sheets

(51) Int. Cl.
*F16M 11/04* (2006.01)
*F16M 13/02* (2006.01)

(58) Field of Classification Search
CPC ............... F16M 11/10; F16M 11/2014; F16M 11/2042; F16M 11/2092; F16M 11/046; F16M 11/048; F16M 11/2064; F16M 11/18; Y10S 248/92; Y10S 248/917
See application file for complete search history.

(56) References Cited

U.S. PATENT DOCUMENTS

| | | | |
|---|---|---|---|
| 2007/0252056 A1* | 11/2007 | Novin | F16M 11/2092 |
| | | | 348/E5.128 |
| 2019/0335135 A1 | 10/2019 | Massey | |
| 2021/0247019 A1* | 8/2021 | Newville | F16M 11/18 |

FOREIGN PATENT DOCUMENTS

| | | |
|---|---|---|
| CN | 107985216 A | 5/2018 |
| CN | 109383402 A | 2/2019 |
| CN | 109398247 A | 3/2019 |
| CN | 209294698 U | 8/2019 |
| CN | 112728307 A | 4/2021 |
| CN | 112738438 A | 4/2021 |
| CN | 213065250 U | 4/2021 |
| EP | 3453556 A1 | 3/2019 |

\* cited by examiner

DISPLAY SCREEN BRACKET

FIELD OF INVENTION

The present disclosure relates to the technical field of electrical accessories, and in particular, to a display screen bracket.

BACKGROUND OF INVENTION

With the rapid development of display technologies, a flat television is favored by consumers by virtue of a small size and a light weight. At present, the flat television is mainly mounted by means of hanging on a wall or using support bases. When to be mounted using the support bases, the flat television is placed on a television cabinet using the support bases. The support bases usually have relatively simple structures. However, the television cabinet occupies a relatively large space. When the flat television is to be hung on a wall, a bracket is first mounted on the wall, and then the flat television is fixed to the bracket. Thus, a relatively small space is occupied.

SUMMARY OF INVENTION

Technical Problem

In the conventional manner of hanging a flat television on a wall, an immovable bracket is usually used to mount the flat television. This manner has the following disadvantages: The flat television after the mounting is relatively fixed and is usually parallel to the wall, and leftward and rightward rotation angles and a pitch angle of the flat television are unadjustable. As a result, requirements for watching at different positions or different angles cannot be satisfied, and diverse use requirements of clients cannot be satisfied.

Thus, a display screen bracket allowing to adjust a watching angle of the flat television in at least one direction after the flat television is mounted by means of hanging on a wall is urgently required, to satisfy the watching requirements for different positions.

Technical Solution

In view of the disadvantages of the prior art, the present disclosure provides a display screen bracket. After a display screen is mounted using the display screen bracket, a watching angle of the display screen may be adjusted in at least one direction.

A display screen bracket is provided. A display screen is swingable about a first axis of the display screen after being mounted using the display screen bracket. The display screen bracket includes:

a first support body, configured to carry the display screen;

a second support body, disposed opposite to the first support body; and a first linkage mechanism, including:

a first adjustment assembly, disposed on the first support body and including a first guide rail and a first guiding member capable of moving along the first guide rail;

a second adjustment assembly, disposed on the second support body and including a second guide rail and a second guiding member capable of moving along the second guide rail; and a first link, wherein one end of the first link is rotatably connected to the first guiding member, and an other end of the first link is rotatably connected to the second guiding member.

Further, the first guiding member is a first motor configured to move along the first guide rail by means of self-driving, and the second guiding member is a second motor configured to move along the second guide rail by means of self-driving.

Further, the first support body is rotatably connected to the second support body.

Further, the display screen bracket further includes:

a first hanger, disposed on the first support body; and a second hanger, disposed on the second support body.

The first hanger is rotatably connected to the second hanger.

A display screen bracket is provided. A display screen is swingable about a first axis of the display screen after being mounted using the display screen bracket. The display screen bracket includes:

a first support body, configured to carry the display screen;

a second support body, disposed opposite to the first support body;

a first linkage mechanism, including:

a first adjustment assembly, disposed on the first support body and including a first guide rail and a first guiding member capable of moving along the first guide rail;

a second adjustment assembly, disposed on the second support body and including a second guide rail and a second guiding member capable of moving along the second guide rail;

a first link, wherein one end of the first link is rotatably connected to the first guiding member, and an other end of the first link is rotatably connected to the second guiding member; and a second link, wherein one end of the second link is rotatably connected to the second guiding member, and an other end of the second link is rotatably connected to the first support body.

Further, the first guiding member is a first motor configured to move along the first guide rail by means of self-driving, and the second guiding member is a second motor configured to move along the second guide rail by means of self-driving.

Further, the first linkage mechanism further includes: a locking boss, disposed on the first support body. The second link is rotatably connected to the locking boss.

Further, the first support body is rotatably connected to the second support body.

A display screen bracket is provided. A display screen is swingable about a first axis of the display screen after being mounted using the display screen bracket. The display screen bracket includes:

a first support body, including a first sub-support body configured to fix the display screen and a second sub-support body disposed between the first sub-support body and a second support body;

the second support body, disposed opposite to the first support body; and a first linkage mechanism, including:

a first adjustment assembly, disposed on the second sub-support body and including a first guide rail and a first guiding member capable of moving along the first guide rail;

a second adjustment assembly, disposed on the second support body and including a second guide rail and a second guiding member capable of moving along the second guide rail; and a first link, wherein one end of the first link is rotatably connected to the first guiding member, and an other end of the first link is rotatably connected to the second guiding member.

Further, the first guiding member is a first motor configured to move along the first guide rail by means of self-driving, and the second guiding member is a second motor configured to move along the second guide rail by means of self-driving.

Further, the display screen is further swingable about a second axis of the display screen after being mounted using the display screen bracket. The second axis is perpendicular to the first axis. The display screen bracket further includes a second linkage mechanism. The second linkage mechanism includes:

a third motor, disposed on the second support body; and a third link, wherein the third motor is drivably connected to one end of the third link, an other end of the third link is connected to the first sub-support body, and an end portion of the third link that is connected to the first sub-support body reciprocates under driving of the third motor to drive the first sub-support body to swing, so as to cause the display screen to swing about the second axis of the display screen.

Further, the second linkage mechanism further includes: an eccentric rotary disc, disposed about a motor shaft of the third motor. An eccentric shaft is disposed on the eccentric rotary disc, and is connected to one end of the third link to drivably connect the third motor to the end of the third link.

Further, one end of the third link is connected to a motor shaft of the third motor, and an other end of the third link is connected to a limiting groove to reciprocate under driving of the third motor.

Further, the first linkage mechanism further includes: a second link, wherein one end of the second link is rotatably connected to the second guiding member, and an other end of the second link is rotatably connected to the first support body.

Further, the first linkage mechanism further includes: a locking boss, disposed on the first support body. The second link is rotatably connected to the locking boss.

Further, a latch is disposed on the first sub-support body, and an end portion of the third link that is connected to the first sub-support body is disposed about the latch.

Further, a first locking sheet, a second locking sheet, and the latch are disposed on a side of the first sub-support body that is close to the second sub-support body, the first locking sheet and the second locking sheet are disposed opposite to each other, one end of the latch extends through the first locking sheet, and an other end of the latch extends through the second locking sheet.

Further, the first support body is rotatably connected to the second support body.

Further, the first sub-support body is rotatably connected to the second sub-support body.

Further, the display screen bracket further includes:

a third hanger, disposed on the first sub-support body; and a fourth hanger, disposed on the second sub-support body.

The third hanger is rotatably connected to the fourth hanger.

Beneficial Effects

The present disclosure provides a display screen bracket. The display screen bracket may be configured to mount a flat television. The display screen bracket includes a first support body configured to carry the display screen, a second support body disposed opposite to the first support body, and a first linkage mechanism configured to connect the first support body to the second support body. The first linkage mechanism includes a first link, a first adjustment assembly disposed on the first support body, and a second adjustment assembly disposed on the second support body. The first adjustment assembly includes a first guide rail and a first guiding member capable of moving along the first guide rail. The second adjustment assembly includes a second guide rail and a second guiding member capable of moving along the second guide rail. One end of the first link is rotatably connected to the first guiding member, and an other end of the first link is rotatably connected to the second guiding member. By means of linkage of the first guiding member, the second guiding member, and the first link, the display screen is swingable about the first axis of the display screen. For example, the display screen is swingable leftward and rightward. In this way, the leftward and rightward rotation angles of the display screen are adjustable.

The first linkage mechanism may further include a second link. One end of the second link is rotatably connected to the second guiding member, and an other end of the second link is rotatably connected to the first support body. By means of the second link, coordination and balance of the display screen during swing about the first axis of the display screen are enhanced. In addition, action of the second link to the second guiding member can offset at least part of action of the first link to the second guiding member, preventing the second guiding member from being damaged as a result of concentration of a local stress on the second guiding member.

In addition, the display screen bracket may further include a second linkage mechanism. By means of the second linkage mechanism, a continuous rotation is transformed into a linear reciprocation, so that the display screen is swingable about the second axis of the display screen. In addition, the first axis is perpendicular to the second axis. For example, the display screen is swingable not only leftward and rightward but also upward and downward, so that the leftward and rightward rotation angles and the pitch angle of the display screen are adjustable. In this way, the requirements for watching at different positions or angles are satisfied, and the diverse use requirements of clients are satisfied.

DETAILED DESCRIPTION OF PREFERRED EMBODIMENTS

To make the foregoing objectives, features, and advantages of the present invention clear and easy to understand, a detailed description is given below by listing preferred embodiments with reference to the accompanying drawings.

In the description of the present disclosure, it should be understood that orientation or position relationships indicated by the terms such as "upper", "lower", "horizontal", "vertical", and "one side" are the orientation or position relationships shown in the accompanying drawings, and are used merely for ease and brevity of illustration and description, rather than indicating or implying that the indicated apparatus or element must have a particular orientation or must be constructed and operated in a particular orientation. Therefore, such terms should not be construed as a limitation to the present disclosure. In addition, the terms "first" and "second" are used merely for the purpose of description, and are not to be construed as indicating or implying relative importance or implying the number of technical features indicated. Therefore, a feature limited by "first" or "second" may explicitly or implicitly include one or more said features. In the description of the present disclosure, "a plurality of" means two or more than two, unless otherwise particularly specified.

Figure 1:
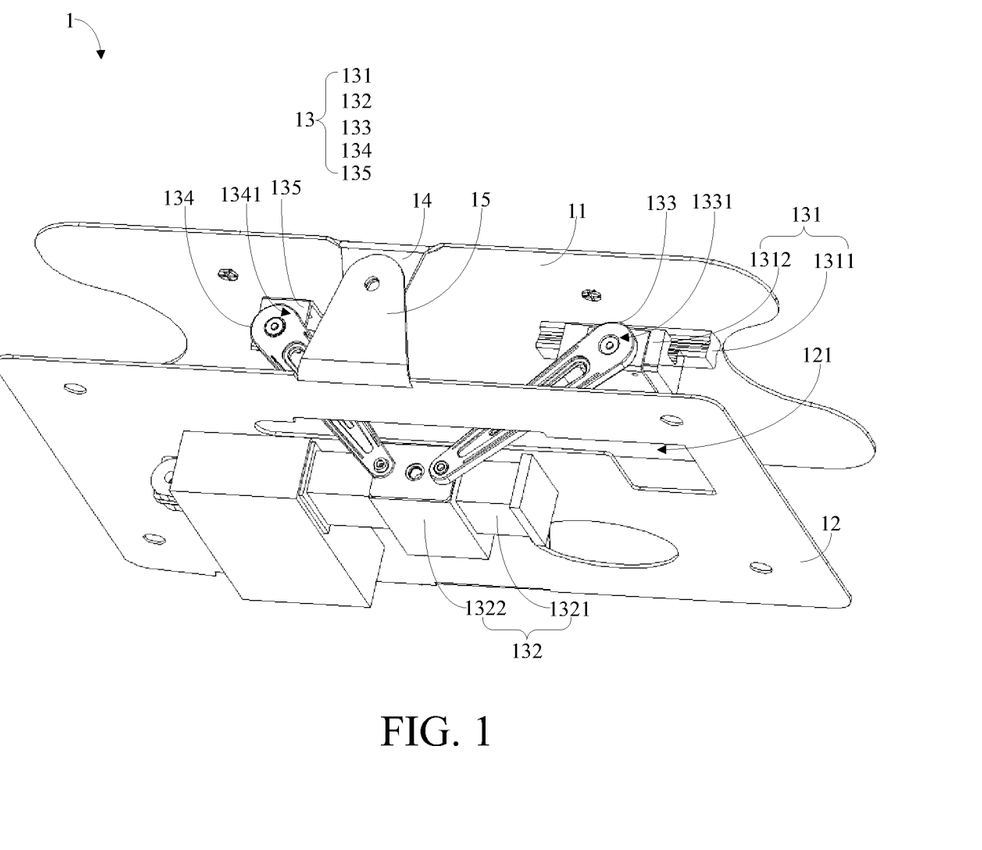
FIG. 1 is a schematic diagram of a structure of a display screen bracket according to an embodiment of the present disclosure.
Figure 2:
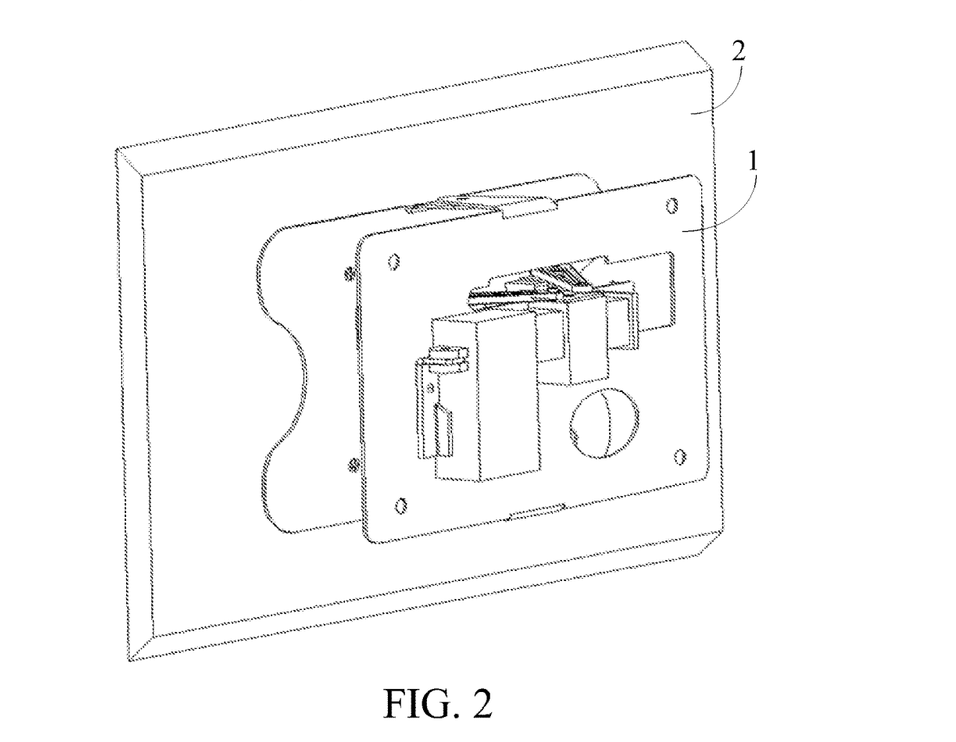
FIG. 2 is a drawing showing an effect after a flat television is mounted to the display screen bracket in FIG. 1.
Figure 3:
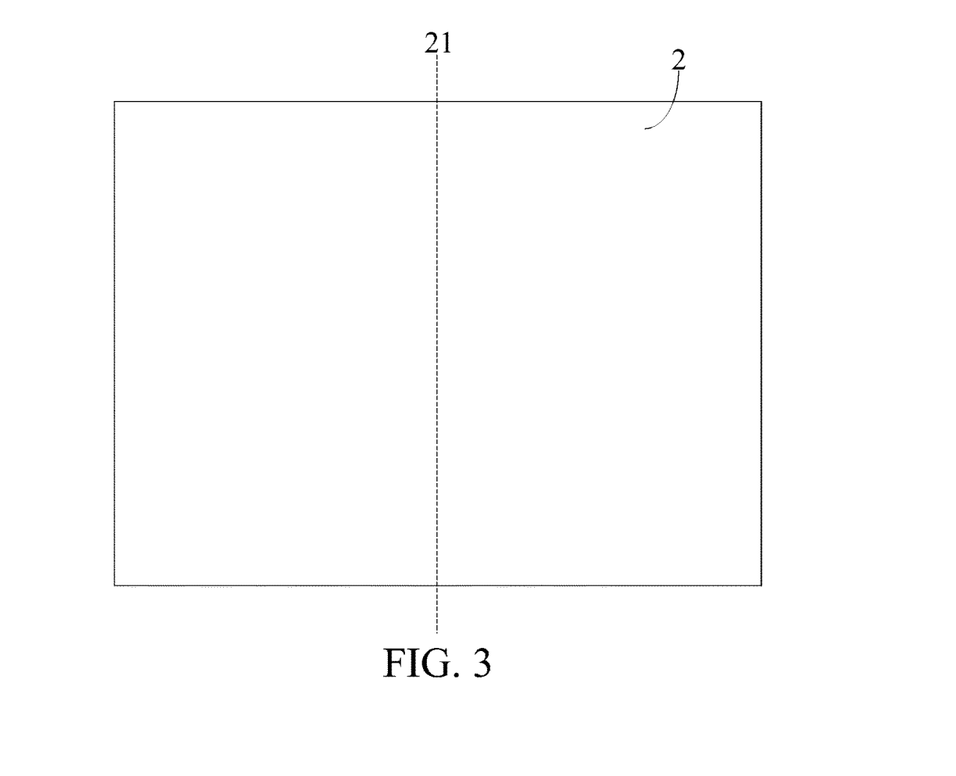
FIG. 3 is a front view of the flat television in FIG. 2.

An embodiment of the present disclosure provides a display screen bracket. A flat television may be mounted to a wall using the display screen bracket. A watching angle of the flat television after the mounting can be adjusted, to satisfy diverse use requirements of clients. As shown in FIGS. 1 to 3, a display screen bracket 1 includes a first support body 11, a second support body 12, and a first linkage mechanism 13. The first support body 11 is configured to carry a flat television 2. The second support body 12 is configured to fix the first support body 11 to a wall or other structures together with the flat television 2. The first linkage mechanism 13 is configured to connect the first support body 11 and the second support body 12 into a whole. After the flat television 2 is mounted using the display screen bracket 1, the flat television 2 is swingable about a first axis 21 of the flat television. In the present embodiment of the present disclosure, the first axis 21 is a vertical axis, that is, the flat television 2 is swingable leftward and rightward.

Still referring to FIG. 1 to FIG. 3, a plurality of screw holes are provided on the first support body 11. A non-display side of the flat television is fixed to the first support body 11 using screws. A material and a shape of the first support body 11 are not particularly limited, and may be selected according to actual needs. The first support body 11 may be in an axisymmetric shape, for example. A central axis of the first support body 11 is parallel to the first axis 21 of the flat television 2.

The second support body 12 and the first support body 11 are disposed opposite to each other. A plurality of screw holes are provided on the second support body 12. The second support body 12 is fixed to the wall or the other structures using screws. A material and a shape of the second support body 12 are not particularly limited, and may be selected according to actual needs.

The first linkage mechanism 13 includes a first adjustment assembly 131, a second adjustment assembly 132, and a first link 133. The first adjustment assembly 131 is disposed on the first support body 11. The second adjustment assembly 132 is disposed on the second support body 12. The first adjustment assembly 131 is connected to the second adjustment assembly 132 using the first link 133.

In detail, the first adjustment assembly 131 is disposed on a side of the first support body 11 that is close to the second support body 12. The first adjustment assembly 131 includes a first guide rail 1311 and a first guiding member 1312. The first guiding member 1312 is capable of moving along the first guide rail 1311. The first guiding member 1312 may be a first motor, for example. The first guiding member 1312 is configured to move along the first guide rail 1311 by means of self-driving.

The second adjustment assembly 132 is disposed on a side of the second support body 12 that is away from the first support body 11. The second adjustment assembly 132 includes a second guide rail 1321 and a second guiding member 1322. The second guiding member 1322 is capable of moving along the second guide rail 1321. The second guiding member 1322 may be a second motor, for example. The second guiding member 1322 is configured to move along the second guide rail 1321 by means of self-driving.

One end of the first link 133 is rotatably connected to the first guiding member 1312, and an other end of the first link 133 is rotatably connected to the second guiding member 1322. The rotatable connection may be implemented as follows, for example. An end portion of the first link 133 is connected to the first guiding member 1312 or the second guiding member 1322 using a rotary shaft.

A hollowed-out structure 121 is provided on the second support body 12. The other end of the first link 133 passes through the hollowed-out structure 121 to be rotatably connected to the second guiding member 1322.

When the first guiding member 1312 and the second guiding member 1322 are both moved toward a right side along the respective guide rails in a top view, the first support body 11 may be driven to rotate anticlockwise, thereby causing the flat television 2 to rotate anticlockwise. When the first guiding member 1312 and the second guiding member 1322 are both moved toward a left side along the respective guide rails, the first support body 11 may be driven to rotate clockwise, thereby driving the flat television 2 to rotate clockwise. That is to say, by simultaneously moving the first guiding member 1312 and the second guiding member 1322 to the right side and the left side in sequence, the flat television 2 is swung leftward and rightward about the first axis 21, thereby adjusting leftward and rightward rotation angles of the flat television 2.

Further, the first linkage mechanism 13 further includes a second link 134. One end of the second link 134 is rotatably connected to the second guiding member 1322, and an other end of the second link 134 is rotatably connected to the first support body 11. An included angle exists between the first link 133 and the second link 134. The rotatable connection may be implemented as follows, for example. An end portion of the second link 134 is connected to the second guiding member 1322 or the first support body 11 using a rotary shaft. The second link 134 is disposed for the following purpose. On one hand, coordination and balance of the flat television 2 during the leftward and rightward swing are enhanced. On the other hand, action of the second link 134 to the second guiding member 1322 can offset at least part of action of the first link 133 to the second guiding member 1322, preventing the second guiding member 1322 from being damaged as a result of concentration of a local stress on the second guiding member 1322.

Further, the end portion of the first link 133 that is rotatably connected to the first guiding member 1312 and the end portion of the second link 134 that is rotatably connected to the first support body 11 are respectively located on two sides of the first axis 21. Preferably, a top face 1331 of the first link 133 and a top face 1341 of the second link 134 are located in a same plan. The plane is perpendicular to the side of the first support body 11 that is close to the second support body 12. In this way, the coordination and the balance of the flat television during the leftward and rightward swing can be enhanced.

Further, the first linkage mechanism 13 further includes a locking boss 135. The locking boss 135 is disposed on the side of the first support body 11 that is close to the second support body 12. Preferably, the locking boss 135 and the first guiding member 1312 are respectively located on the two sides of the first axis 21. The other end of the second link 134 is rotatably connected to the locking boss 135. For example, the other end of the second link 134 is connected to the locking boss 135 using a rotary shaft. In addition, the second guiding member 1322 is disposed between the locking boss 135 and the first guiding member 1312. The first guiding member 1312, the second guiding member 1322, and the locking boss 135 may be connected to form a triangle. The first link 133 and the second link 134 may be considered as two sides of the triangle.

Further, the display screen bracket 1 further includes a first hanger 14 and a second hanger 15. The first hanger 14 is disposed on the first support body 11, the second hanger 15 is disposed on the second support body 12, and the first hanger 14 is rotatably connected to the second hanger 15. The first hanger 14 and the second hanger 15 are configured to connect the first support body 11 to the second support body 12. In this way, not only the connection between the first support body 11 and the second support body 12 is firmer, but also the first support body 11 is swung leftward and rightward more conveniently.

In detail, in a top view, a first hanger 14 is disposed on each of a top and a bottom of the first support body 11, and a second hanger 15 is disposed at each of positions on a top and a bottom of the second support body 12 that are corresponding to the positions of the first hangers 14. The first hanger 14 and the second hanger 15 are in an overlapping arrangement. Shaft holes are provided on the first hanger 14 and the second hanger 15 at an overlapping position. A rotary shaft extends through the shaft holes to rotatably connect the first hanger 14 to the second hanger 15.

In another embodiment of the present disclosure, as shown in FIGS. 4 to 7, the display screen bracket 1 further includes a second linkage mechanism 16. After the flat television 2 is mounted using the display screen bracket 1, the flat television 2 is swingable about both the first axis 21 of the flat television 2 and a second axis 22 of the flat television. The first axis 21 is perpendicular to the second axis 22. That is to say, the first axis 21 is a vertical axis, and the flat television 2 is swingable leftward and rightward about the first axis 21, so that the leftward and rightward rotation angles of the flat television 2 are adjustable. The second axis 22 is a horizontal axis, and the flat television 2 is swingable upward and downward about the second axis 22, so that a pitch angle of the flat television 2 is adjustable.

In detail, still referring to FIGS. 4 to 7, the display screen bracket 1 includes a first support body 11, a second support body 12, a first linkage mechanism 13, and a second linkage mechanism 16. The first support body 11 is configured to carry the flat television. The second support body 12 is fixed to a wall or other structures. The first linkage mechanism 13 is configured to adjust the leftward and rightward rotation angles of the flat television 2. The second linkage mechanism 16 is configured to adjust the pitch angle of the flat television 2.

The first support body 11 includes a first sub-support body 111 and a second sub-support body 112. The first sub-support body 111 and the second sub-support body 112 are disposed opposite to each other and are rotatably connected.

The second sub-support body 112 is in an axisymmetric shape. A central axis of the second sub-support body 112 is parallel to the first axis 21.

In a top view, a first hanger 14 is disposed on each of a top and a bottom of the second sub-support body 112, and a second hanger 15 is disposed at each of positions on a top and a bottom of the second support body 12 that are corresponding to the positions of the first hangers 14. The first hanger 14 and the second hanger 15 are in an overlapping arrangement. Shaft holes are provided on the first hanger 14 and the second hanger 15 at an overlapping position. A rotary shaft extends through the shaft holes to rotatably connect the first hanger 14 to the second hanger 15.

A third hanger 17 is disposed on each of two sides of the first sub-support body 111, and a fourth hanger 18 is disposed at each of positions on two sides of the second sub-support body 112 that are corresponding to the positions of the third hangers 17. The third hanger 17 and the fourth hanger 18 are in an overlapping arrangement. Shaft holes are provided on the third hanger 17 and the fourth hanger 18 at an overlapping position. A rotary shaft extends through the shaft holes to rotatably connect the third hanger 17 to the fourth hanger 18.

The first linkage mechanism 13 includes a first adjustment assembly 131, a second adjustment assembly 132, a first link 133, a second link 134, and a locking boss (not shown). The first adjustment assembly 131 is disposed on a side of the second sub-support body 112 that is away from the first sub-support body 111. The second adjustment assembly 132 is disposed on a side of the second support body 12 that is away from the second sub-support body 112. The first adjustment assembly 131 is connected to the second adjustment assembly 132 using the first link 133. The second sub-support body 112 is connected to the second adjustment assembly 132 using the second link 134. The locking boss is disposed on the side of the second sub-support body 112 that is away from the first sub-support body 111. The locking boss and the first guiding member 131 are spaced apart from each other and are respectively disposed on the two sides of the first axis 21.

The first adjustment assembly 131 includes a first guide rail 1311 and a first guiding member 1312. The first guiding member 1312 is capable of moving along the first guide rail 1311. The first guiding member 1312 may be a first motor, for example. The first guiding member 1312 is configured to move along the first guide rail 1311 by means of self-driving.

The second adjustment assembly 132 includes a second guide rail 1321 and a second guiding member 1322. The second guiding member 1322 is capable of moving along the second guide rail 1321. The second guiding member 1322 may be a second motor, for example. The second guiding member 1322 is configured to move along the second guide rail 1321 by means of self-driving.

One end of the first link 133 is rotatably connected to the first guiding member 1312 using a rotary shaft. An other end of the first link 133 is rotatably connected to the second guiding member 1322 using a rotary shaft. A hollowed-out structure 121 is provided on the second support body 12. The other end of the first link 133 passes through the hollowed-out structure 121 to be rotatably connected to the second guiding member 1322.

One end of the second link 134 is rotatably connected to the second guiding member 1322 using a rotary shaft. The other end of the second link 134 is rotatably connected to the locking boss 135 using a rotary shaft. The second guiding member 1322 is disposed between the locking boss and the first guiding member 1312. The first guiding member 1312, the second guiding member 1322, and the locking boss may be connected to form a triangle. The first link 133 and the second link 134 may be considered as two sides of the triangle. A top face 1331 of the first link 133 and a top face (not marked) of the second link 134 are located in a same plan. The plane is perpendicular to the side of the second sub-support body 112 that is close to the second support body 12. In this way, the coordination and the balance of the flat television 2 during the leftward and rightward swing can be enhanced.

Still referring to FIGS. 4 to 7, the second linkage mechanism 16 includes a third motor 161 and a third link 162. The third motor 161 is disposed on the side of the second sub-support body 112 that is away from the first sub-support body 111. The third motor 161 is located above the locking boss. The third motor 161 is drivably connected to one end of the third link 162. An other end of the third link 162 is connected to the first sub-support body 111. An end portion of the third link 162 that is connected to the first sub-support body 111 reciprocates in a vertical direction under driving of the third motor 161 to drive the first sub-support body 111 to swing upward and downward, so as to cause the flat television 2 to swing about the second axis 22 of the flat television.

Figure 4:
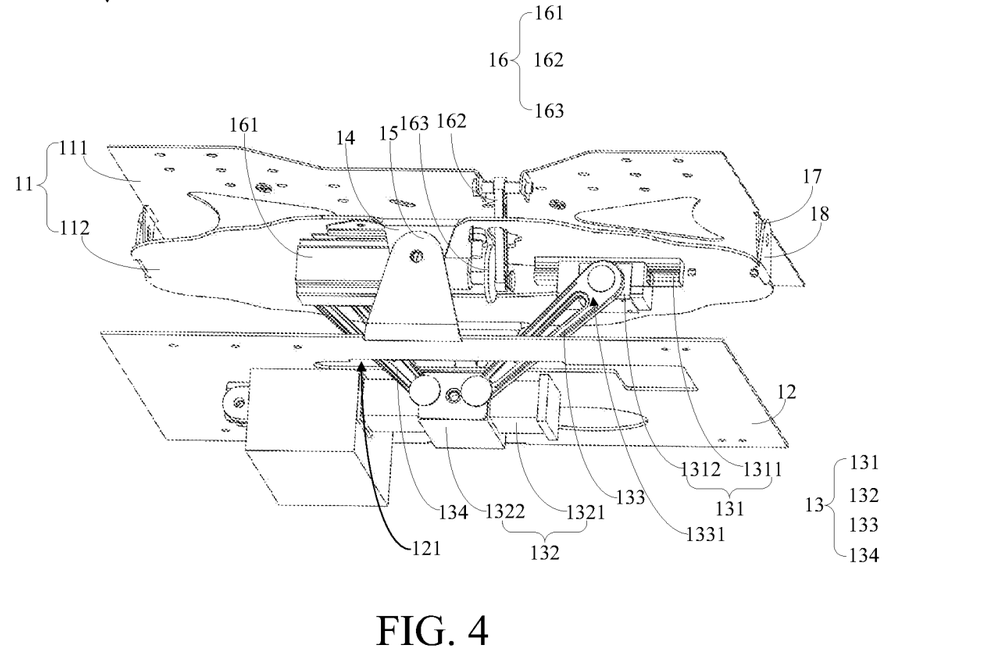
FIG. 4 is a schematic diagram of a structure of a display screen bracket according to another embodiment of the present disclosure.
Figure 5:
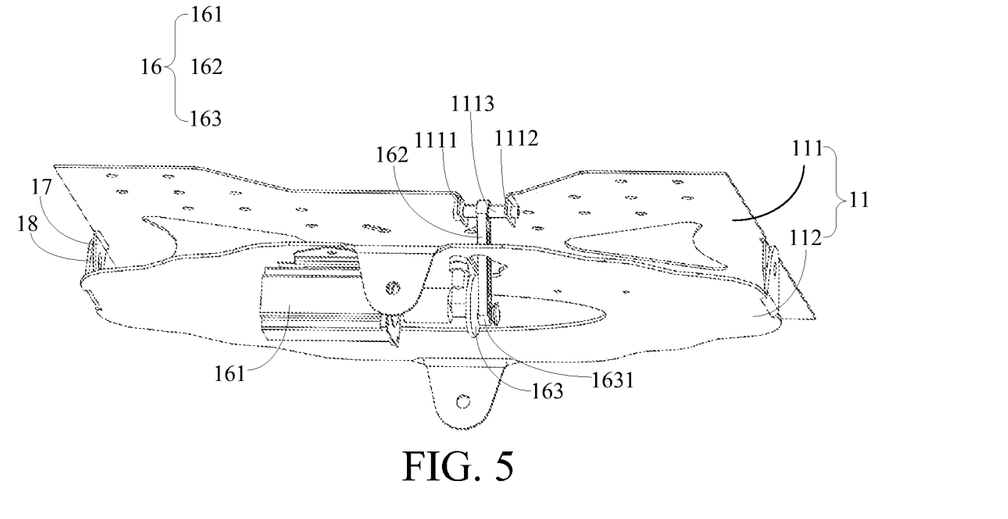
FIG. 5 is a schematic diagram of a structure of a first support body and a second linkage mechanism in FIG. 4.
Figure 6:
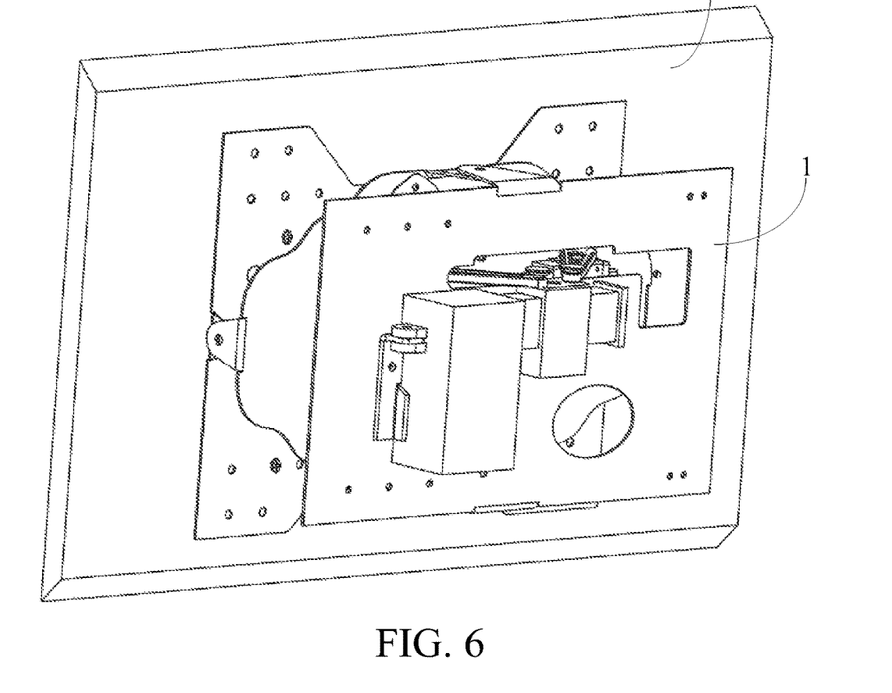
FIG. 6 is a drawing showing an effect after a flat television is mounted to the display screen bracket in FIG. 1.
Figure 7:
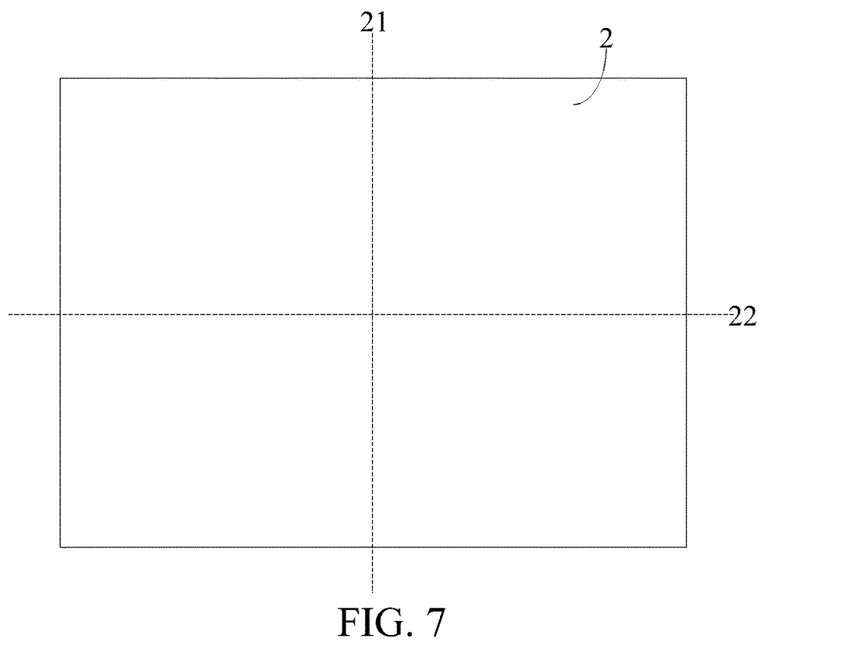
FIG. 7 is a front view of the flat television in FIG. 6.

In detail, still referring to FIG. 4 and FIG. 5, the second linkage mechanism 16 further includes an eccentric rotary disc 163. The eccentric rotary disc 163 is disposed about a motor shaft of the third motor 161. The eccentric rotary disc 163 is rotated clockwise or anticlockwise under driving of the third motor 161. An eccentric shaft 1631 is disposed on the eccentric rotary disc 163. The eccentric shaft 1631 is connected to one end of the third link 162 to drivably connect the third motor 161 to the end of the third link 162. In the present embodiment of the present disclosure, by means of the third link 162, a rotation of the eccentric rotary disc 163 is transformed to swing of the first sub-support body 111 in a vertical direction, thereby causing the flat television 2 to swing upward and downward about the second axis 22.

It should be noted that, the second linkage mechanism 16 may also have no eccentric rotary disc 163. One end of the third link 162 may be directly connected to the motor shaft of the third motor 161. In this case, a limiting groove, such as a Z-shaped limiting groove is required to be provided on the other end of the third link 162, so as to cause the other end of the third link 162 to reciprocate upward and downward in a vertical direction.

Still referring to FIGS. 4 to 7, a first locking sheet 1111, a second locking sheet 1112, and a latch 1113 are disposed on a side of the first sub-support body 111 that is close to the second sub-support body 112. The first locking sheet 1111 and the second locking sheet 1112 are disposed opposite to each other. One end of the latch 1113 extends through the first locking sheet 1111, and an other end of the latch 1113 extends through the second locking sheet 1112. That is to say, the latch 1113 is mounted and fixed using the first locking sheet 1111 and the second locking sheet 1112. The end portion of the third link 162 that is connected to the first sub-support body 111 is disposed about the latch 1113, to connect the other end of the third link 162 to the first sub-support body 111.

It should be noted that, the first link, the second link, and the third link provided in the above embodiments of the present disclosure may be crank links, for example. The first motor, the second motor, and the third motor may be rotary motors, for example. The second support body may be fixed to a wall or other structures. For example, the second support body may be fixed to a bracket including a telescopic mechanism. A linear distance between the first support body and the second support body is adjusted using a telescopic function of the telescopic mechanism, to adjust a linear distance between the flat television and a watcher.

In the foregoing embodiments, the descriptions of the embodiments have respective focuses. For a part that is not described in detail in an embodiment, reference can be made to the detailed description of other embodiments provided above, and the details will not be described herein again.

A display screen bracket provided in the embodiments of the present disclosure is described above in detail. Although the principles and implementations of the present invention are described by using specific examples in this specification, the descriptions of the foregoing embodiments are merely used for helping understand the method and the core idea of the present invention. Meanwhile, a person skilled in the art may make modifications to the specific implementations and application range according to the idea of the present invention. In conclusion, the content of this specification is not to be construed as a limitation to the present invention.

What is claimed is:

1. A display screen bracket, wherein a display screen is swingable about a first axis of the display screen after being mounted using the display screen bracket, and the display screen bracket comprises:
  a first support body, comprising a first sub-support body configured to fix the display screen and a second sub-support body disposed between the first sub-support body and a second support body;
  the second support body, disposed opposite to the first support body; and
  a first linkage mechanism, comprising:
  a first adjustment assembly, disposed on the second sub-support body and comprising a first guide rail and a first guiding member capable of moving along the first guide rail;
  a second adjustment assembly, disposed on the second support body and comprising a second guide rail and a second guiding member capable of moving along the second guide rail; and
  a first link, wherein one end of the first link is rotatably connected to the first guiding member, and an other end of the first link is rotatably connected to the second guiding member;
  wherein the first guiding member is a first motor configured to move along the first guide rail by means of self-driving; and the second guiding member is a second motor configured to move along the second guide rail by means of self-driving;
  wherein the display screen is further swingable about a second axis of the display screen after being mounted using the display screen bracket, the second axis is perpendicular to the first axis, the display screen bracket further comprises a second linkage mechanism, and the second linkage mechanism comprises:
  a third motor, disposed on the second sub-support body; and
  a third link, wherein the third motor is drivably connected to one end of the third link, an other end of the third link is connected to the first sub-support body, and an end portion of the third link that is connected to the first sub-support body reciprocates under driving of the third motor to drive the first sub-support body to swing, so as to cause the display screen to swing about the second axis of the display screen.

2. The display screen bracket as claimed in claim 1, wherein the second linkage mechanism further comprises: an eccentric rotary disc, disposed about a motor shaft of the third motor; and an eccentric shaft is disposed on the eccentric rotary disc, and is connected to one end of the third link to drivably connect the third motor to the end of the third link.

3. The display screen bracket as claimed in claim 1, wherein the first linkage mechanism further comprises: a second link, wherein one end of the second link is rotatably connected to the second guiding member, and an other end of the second link is rotatably connected to the first support body.

4. The display screen bracket as claimed in claim 3, wherein the first linkage mechanism further comprises: a locking boss, disposed on the first support body; and the second link is rotatably connected to the locking boss.

5. The display screen bracket as claimed in claim 1, wherein a latch is disposed on the first sub-support body, and an end portion of the third link that is connected to the first sub-support body is disposed about the latch.

6. The display screen bracket as claimed in claim 5, wherein a first locking sheet, a second locking sheet, and the latch are disposed on a side of the first sub-support body that is close to the second sub-support body, the first locking sheet and the second locking sheet are disposed opposite to each other, one end of the latch extends through the first locking sheet, and an other end of the latch extends through the second locking sheet.

7. The display screen bracket as claimed in claim 1, wherein the first support body is rotatably connected to the second support body.

8. The display screen bracket as claimed in claim 1, wherein the first sub-support body is rotatably connected to the second sub-support body.

9. The display screen bracket as claimed in claim 8, wherein the display screen bracket further comprises:
- a third hanger, disposed on the first sub-support body; and
- a fourth hanger, disposed on the second sub-support body, wherein
- the third hanger is rotatably connected to the fourth hanger.

* * * * *